Figure 1:
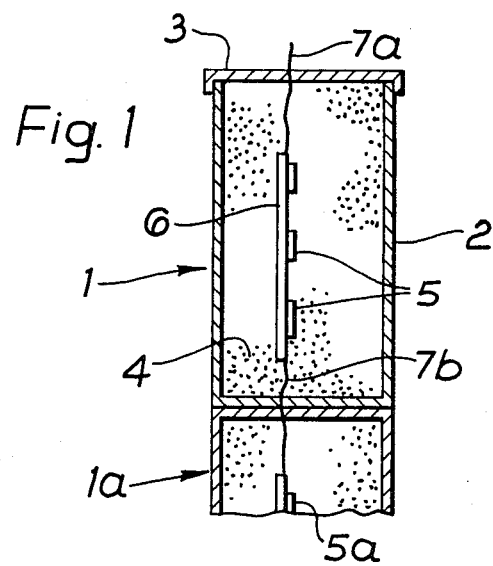

United States Patent [19]

Artus

[11] Patent Number: 4,762,174

[45] Date of Patent: Aug. 9, 1988

[54] HEAT SINK

[76] Inventor: Raymonde G. C. Artus, The Cedars, 95 Crescent Road, Reading, Berkshire, England

[21] Appl. No.: 850,773

[22] Filed: Apr. 11, 1986

[30] Foreign Application Priority Data

Apr. 12, 1985 [GB] United Kingdom ............... 8509439

[51] Int. Cl.⁴ .............................................. F28F 7/00
[52] U.S. Cl. ................................... 165/185; 361/386; 174/17 S
[58] Field of Search ..................... 165/185; 361/386; 174/17 SF

[56] References Cited

U.S. PATENT DOCUMENTS

| 1,751,939 | 3/1930 | Meissner | 174/17 SF |
| 2,550,452 | 4/1951 | Byrne et al. | 174/17 SF |
| 3,386,015 | 5/1968 | Ramsey | 317/234 |
| 4,299,715 | 11/1981 | Whitfield et al. | 165/185 |

FOREIGN PATENT DOCUMENTS 2480488 10/1981 France .
578869 7/1946 United Kingdom ........... 174/17 SF

OTHER PUBLICATIONS

European Patent Application, Publication No. 0,137,385, Published 4/85, Inventor—Ogihara.

Primary Examiner—Randall L. Green
Attorney, Agent, or Firm—Finnegan, Henderson, Farabow, Garrett & Dunner

[57] ABSTRACT

A heat sink is provided comprising a mixture of electrically non-conductive particles of microcrystalline material, such as diamond or cubic boron nitride, and an electrically non-conductive filler material, such as a fluorocarbon or paraffin, which fills the voids between said particles. The heat sink has a thermal conductivity that is non-linear with temperature and which has a positive coefficient such that the thermal conductivity increases with increasing temperature.

7 Claims, 1 Drawing Sheet

HEAT SINK

This invention relates to heat sinks.

The development of electronics has been in the direction of greater complexity and smaller volume.

The greater complexity requirement is an inevitable consequence of the increase in the use of electronics itself. Smaller volume requirements relate to the number of operations that can be performed on a signal in a given time. As the complexity requirement grows, the number of operations per second must increase. Since all electrical signals travel at the speed of light, and this speed cannot be exceeded, the distance between each operator must decrease, and it is for this reason that the micro-chip manufacturers attempt to get more circuitry per unit area of silicon chip.

The improvement of reliability and greater ruggedness are desirable side effects of this process and reinforce the drive to greater use of electronics. The physical limits of the materials used in the process of manufacturing micro-chips have almost been reached with regard to the density of circuits per unit area. Manufacturers are already at the level of sub-micron spacing; improvements in materials will not increase the speed, therefore larger areas must be used. The restriction on complexity per device is now due to the error rate in the manufacturing process. At error rates of 90% of production, the cost per device becomes uneconomic even to the sophisticated manufacturers.

Significant reduction in the error rate will be an exceedingly difficult and slow process, simply because of the total number of operators or gates involved per unit area, the failure of any one gate causing a total device failure. Clever circuitry enables an element of redundancy to be built into the device, thus a reduced value chip (lower performance) or a lower error rate is achieved. However, the cost of doing this is to increase the total number of gates. This route obviously has considerable limitations.

The future development of electronics is likely to be in the direction of total hybridisation. By this means, complex circuits will be assembled from a collection of production efficient, pre-tested micro-chips, to form a macro-chip. The chip to chip distance must be small and a three dimensional circuit design is inevitable. This process has already started and been implemented. The major problem encountered in this project has been the cooling of the individual chips. Thus the development of a high thermally conducting heat sink, suitable for the cooling of an array of micro-chips, is now eminently desirable. There are thermally conductive pastes and ceramics available, but none has proved particularly satisfactory.

The present invention provides a heat sink comprising a mixture of electrically non-conductive particles of microcrystalline material and an electrically non-conductive filler material which fills the voids between the particles of microcrystalline material, the concentration of the particles being such that the heat sink has a thermal conductivity that is non-linear with temperature and which has a positive coefficient such that the thermal conductivity increases with increasing temperature.

Further according to the invention, a macro-chip comprises a plurality of electrically connected micro-chips embedded in a heat sink as defined above.

Still further according to the invention, the heat sink of the invention is itself in thermal contact with another heat sink.

The microcrystalline material is preferably diamond or cubic boron nitride, although other microcrystalline materials such as sapphire or silicon carbide or mixtures of any of the foregoing may also be used.

The particles of microcrystalline material are provided in a concentration suitable to provide a predetermined thermal conducting path, i.e. a path enabling heat to be rapidly removed from a critical area. In the case of micro-chips embedded in the heat sink, the micro-chips will be in thermal contact with the particle mixture so that heat generated in the chip is rapidly removed therefrom. Generally, chip temperatures should be kept below 300° C. and the heat sink of the invention has been found ideally suitable to achieve this. Typically, the particle concentration will be in excess of 50%, and preferably in excess of 60%, by volume with a mean particle to particle distance of about $0.1\mu$ or less. The sizes of the particles is not critical so long as there are sufficient particles of $0.1\mu$ or less to provide the required mean particle to particle distance. Also, damage to the microchips due to vibration is minimised.

The filler material must be electrically non-conductive, have a high breakdown voltage, and should desirably have low shrinkage and thermal expansion, good flow characteristics, and be able to withstand temperatures of at least 300° C. It is also desirable that the filler material be degradable under certain conditions so that if it is desired to recover any chips or circuitry embedded in the heat sink this can be done.

Examples of suitable filler materials are silicone oils, fluorocarbons and paraffins. These may be used either singly or as mixtures. Preferably the filler material is in liquid form so that when mixed with the particulate material a stiffish paste is obtained.

The heat sink of the invention has particular application to the manufacture of macro-chips. Such macro-chips will consist of an array of micro-chips electrically connected to define a circuit and embedded in the heat sink.

Figure 2:
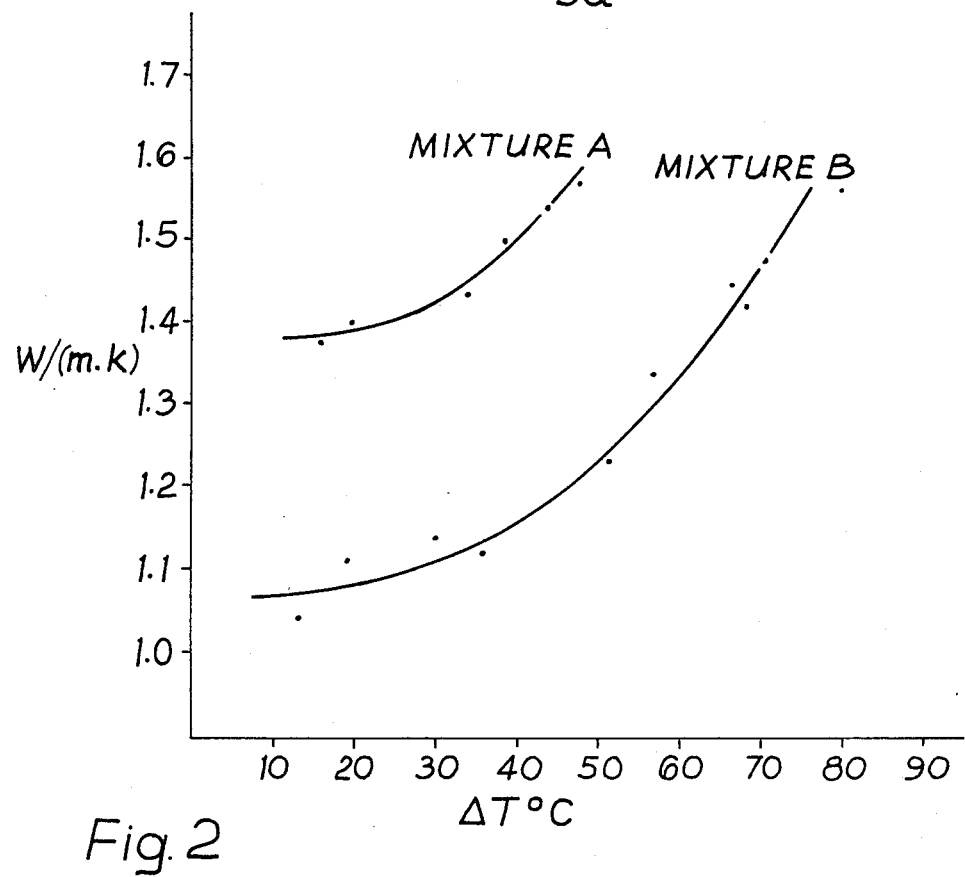

The invention will be more particularly described with reference to the accompanying drawings, in which:

FIG. 1 is a diagrammatic sectional elevation of a macro-chip comprising a heat sink according to the present invention, and FIG. 2 is a graph illustrating the thermal conductivity of two embodiments of heat sink according to the present invention.

Referring to FIG. 1 it will be seen that the macro-chip illustrated therein comprises a heat sink generally designated 1 comprising a cell 2 sealingly closed by a cover 3 and packed with a mixture 4 consisting of electrically non-conductive particles of a microcrystalline material and an electrically non-conductive filler material which fills the voids between the particles of microcrystalline material. Embedded in the mixture 4 is a plurality of electrically connected micro-chips 5 mounted on a substrate 6 and in direct heat conducting contact with the mixture 4 so that heat will be conducted away from the micro-chips 5. Electrical leads 7a, 7b electrically connected to the micro-chips 5 serve for connecting the macro-chip into suitable electrical circuitry. Whilst only a single plurality of micro-chips 5 is shown it will be understood that two or more pluralities of micro-chips 5 could be embedded in the mixture 4 and that these pluralities of micro-chips can be electrically interconnected as required to provide a required array of micro-chips, e.g., a three-dimensional array of micro-chips.

If desired the heat sink 1 can be in thermally conducting contact with another heat sink 1a which in the illustrated embodiment is of the same kind as the heat sink 1 but which may be of a different kind. The micro-chips 5 contained in the heat sink 1 are electrically connected to the micro-chips 5a contained in the heat sink 1a by the electrical lead 7b.

The particles of microcrystalline material in the mixture 4 are diamond particles although particles of other microcrystalline materials such as cubic boron nitride, sapphire or silicon carbide may be used if desired. The filler material in the mixture 4 is a fluorocarbon or paraffin although other suitable filler materials may be used if desired.

The mixture 4 is in the form of a stiffish paste with a diamond particle concentration of at least 50%, and preferably at least 60%, by volume. The particle size distribution and the packing of the mixture 4 into the cell 2 is such as to give a mean particle to particle distance of about 0.1 or less. Before being incorporated into the mixture 4 the diamond particles were thoroughly cleaned of surface contamination by washing in acid, rinsing with ultra pure water and then baking in a furnance under vacuum.

EXAMPLE I

Diamond powder with a particle size distribution such that at approximately 65% volume fraction the mean particle to particle distance is about $0.1\mu$ was cleaned in acid, rinsed with ultra pure water to remove gross surface contamination and then baked in a furnace at about 500° C. and under vacuum of at least $1.10^{-6}$ Torr until all water had been driven off together with as much absorbed material as possible. The furnace temperature was then reduced to 120° C. and vapour of n-decane introduced into the vacuum. The vapour pressure was increased until the n-decane condensed. The powder was then removed to a closed container at 100° C. and a mixture of n-decane and 1.4 Mol % of fluorocarbon oil was added in sufficient quantity to wet the powder. The resulting mixture was then packed into a cell to approximately 65% volume fraction, particular care being taken to exclude all voids, and the cell sealed. The resulting mixture exhibited a thermal conductivity that was non-linear with temperature and which had a positive coefficient in that the thermal conductivity increased with increasing temperature.

The proportion of fluorocarbon oil to n-decane in the mixture which is added to the diamond powder can be varied according to the density of the diamond powder in the final mixture to provide optimum thermal conductivity and coefficient value, the correct proportion for any given density being readily determined by trial and error.

EXAMPLE II

A mixture A comprising 63% diamond particles and paraffin was prepared in a similar manner to that described in Example I. The mixture A was packed into a cell to substantially 63% volume fraction and the thermal conductivity in watts per meter kelvin (W/(m.K)) was measured at different temperatures across the cell ($\Delta T$). The results are shown in FIG. 2 and in Table I.

TABLE I

| Mixture | $\Delta T°$ C. | W/(m.K) |
|---|---|---|
| 63% diamond/paraffin | 16 | 1.37 |
|  | 20 | 1.40 |
|  | 34 | 1.43 |
|  | 39 | 1.49 |
|  | 43 | 1.53 |
|  | 48 | 1.56 |

Table I and FIG. 2 clearly demonstrate that the thermal conductivity was non-linear with temperature and had a positive coefficient.

EXAMPLE III

A mixture B comprising 58% diamond particles and fluorocarbon was prepared in a similar manner to that described in Example I. The mixture B was packed into a cell to substantially 58% volume fraction and the thermal conductivity in watts per meter Kelvin (W/(m.K)) was measured at different temperatures across the cell ($\Delta T$). The results are shown in FIG. 2 and in Table II.

TABLE II

| Mixture B | $\Delta T°$ C. | W/(m.K) |
|---|---|---|
| 58% diamond/fluorocarbon | 13.5 | 1.04 |
|  | 19 | 1.12 |
|  | 30 | 1.14 |
|  | 36 | 1.18 |
|  | 51 | 1.23 |
|  | 56.5 | 1.33 |
|  | 66 | 1.42 |
|  | 68 | 1.44 |
|  | 71 | 1.47 |
|  | 80 | 1.56 |

Table II and FIG. 2 clearly demonstrate that the thermal conductivity was non-linear with temperature and had a positive coefficient in that thermal conductivity increased with increasing temperature.

Whilst the mechanism of the heat sink of the present invention is not fully understood it is believed that atoms of the filler material rebound between opposed surfaces of the closely packed diamond particles with increasing rapidity as the temperature increases with the result that the thermal conductivity of the mixture increases non-linearly with temperature and has a positive coefficient.

By increasing the density of the diamond powder in the mixture the value of the thermal conductivity at a given temperature can be increased as can the value of the coefficient. This can be seen from a comparison of Tables I and II and from FIG. 2.

Since contamination on the diamond powder particles reduces the value of the coefficient, the better the cleaning of the diamond particles the better the results will be.

What is claimed is:

1. A heat sink comprising a sealed cell packed with a stiff paste consisting essentially of a mixture of electrically non-conductive particles of at least one microcrystalline material selected from the group consisting of diamond, cubic boron nitride, sapphire and silicon carbide and an electrically non-conductive filler material which fills the voids between the particles of the microcrystalline material, the particles being of a concentration to produce in the heat sink a thermal conductivity that is non-linear with temperature and which has a positive coefficient such that the thermal conductivity increases with increasing temperature, and wherein the mean particle to particle distance is about $0.1\mu$ or less.

2. A heat sink according to claim 1, wherein the particle concentration is in excess of 50% by volume.

3. A heat sink according to claim 1, wherein the particle concentration is in excess of 60% by volume.

4. A heat sink according to claim 1, wherein the filler material is selected from the group comprising silicone oils, fluorocarbons and paraffins or mixtures thereof.

5. A heat sink according to claim 1, wherein an array of electrically connected micro-chips is embedded in the said mixture so as to be in thermal contact therewith.

6. A heat sink comprising a sealed cell packed with a mixture of electrically non-conductive particles of microcrystalline material and an electrically non-conductive filler material which fills the voids between said particles, the particle concentration in said mixture being in excess of 50% by volume and the mean particle to particle distance being about $0.1\mu$ or less to produce in the heat sink a thermal conductivity that is non-linear with temperture and which has a positive coefficient such that the thermal conductivity increases with increasing temperature.

7. A macro-chip comprising a heat sink consisting of a sealed cell packed with a mixture of electrically non-conductive particles of microcrystalline material and an electrically non-conductive filler material which fills the voids between said particles, the particle concentration in said mixture being in excess of 50% by volume and the mean particle to particle distance being about $0.1\mu$ or less to produce in the heat sink a thermal conductivity that is non-linear with temperature and which has a positive coefficient such that the thermal conductivity increases with increasing temperature, and an array of electrically connected micro-chips embedded in said mixture so as to be in thermal contact therewith.

* * * * *